United States Patent [19]
Addie

[11] Patent Number: 5,958,554
[45] Date of Patent: Sep. 28, 1999

[54] RECONSTITUTED LEATHER PRODUCT AND PROCESS

[75] Inventor: Benjamin A. Addie, Cannon Falls, Minn.

[73] Assignee: Mat, Inc., Floodwood, Minn.

[21] Appl. No.: 08/658,682

[22] Filed: Jun. 5, 1996

[51] Int. Cl.[6] .................................................. D06N 3/00
[52] U.S. Cl. .......................... 428/151; 428/904; 428/196; 428/198; 524/11; 264/109; 264/122
[58] Field of Search .................. 524/11; 428/904, 428/151, 196, 198; 264/109, 121, 122; 442/330, 333, 415, 416, 409

[56] References Cited

U.S. PATENT DOCUMENTS

| | | | |
|---|---|---|---|
| 656,869 | 8/1900 | Walden | 428/904 |
| 878,485 | 2/1908 | Case . | |
| 1,188,600 | 6/1916 | Adams, Jr. | 524/11 |
| 1,376,553 | 5/1921 | Lander | 428/473 |
| 1,527,163 | 2/1925 | Ampt . | |
| 1,672,537 | 6/1928 | Novak | 428/473 |
| 1,750,231 | 3/1930 | Lifton | 428/904 |
| 2,040,511 | 12/1936 | Bleyenheuft | 524/11 |
| 2,148,904 | 12/1939 | Horowitz | 524/11 |
| 2,370,457 | 2/1945 | Gocher | 260/748 |
| 2,381,774 | 8/1945 | Riefenstahl | 264/122 |
| 2,601,671 | 6/1952 | Wilson | 524/11 |
| 2,948,692 | 8/1960 | Pattilloch | 260/8 |
| 3,026,242 | 3/1962 | Emery | 162/146 |
| 3,486,925 | 12/1969 | Hoffman | 428/904 |
| 3,616,169 | 10/1971 | Okamura | 162/151 |
| 3,619,275 | 11/1971 | Barash | 162/144 |
| 3,663,472 | 5/1972 | Raymond | 260/6 |
| 3,708,333 | 1/1973 | Carlson | 117/140 A |
| 3,745,041 | 7/1973 | Raymond | 428/904 |
| 3,756,909 | 9/1973 | Stepan | 162/151 |
| 4,011,130 | 3/1977 | Worden | 162/151 |
| 4,162,996 | 7/1979 | Parrini et al. | 524/11 |
| 4,202,919 | 5/1980 | Cavallo | 427/245 |
| 4,287,252 | 9/1981 | Dimiter | 428/316 |
| 4,288,498 | 9/1981 | Scribner, Jr. | 428/473 |
| 4,418,031 | 11/1983 | Doerer et al. | 264/241 |
| 4,474,846 | 10/1984 | Doerer et al. | 428/284 |
| 4,497,871 | 2/1985 | Henke | 428/473 |
| 4,510,702 | 4/1985 | Ehrlich, Jr. | 36/86 |
| 4,520,058 | 5/1985 | Okabe | 428/90 |
| 4,544,676 | 10/1985 | Gyurko et al. | 521/84.1 |
| 4,552,909 | 11/1985 | Czerwinski et al. | 524/11 |
| 4,834,762 | 5/1989 | Nishibori | 8/94.1 R |
| 4,983,245 | 1/1991 | Schaefer | 156/231 |
| 5,028,285 | 7/1991 | Wyler | 156/61 |
| 5,100,707 | 3/1992 | Nishibori | 428/15 |
| 5,134,178 | 7/1992 | Nishibori | 524/11 |
| 5,153,067 | 10/1992 | Yoshida et al. | 428/402 |
| 5,171,494 | 12/1992 | Nishibori | 264/48 |
| 5,272,190 | 12/1993 | Kai et al. | 524/11 |

FOREIGN PATENT DOCUMENTS 1088991   10/1967   United Kingdom .

*Primary Examiner*—Marion McCamish
*Assistant Examiner*—Cheryl Juska
*Attorney, Agent, or Firm*—Palmatier, Sjoquist, Voigt & Christensen, P.A.

[57] ABSTRACT

A reconstituted leather product and process for making. The reconstituted leather product can be finished to have the look and feel of real leather and physical properties equivalent thereto. The process is essentially dry and involves reducing leather materials to fibers, preferably not longer than one inch. The process further involves blending these fibers with synthetic fibers, a resin and optionally other additives, forming the mixture into a mat, curing the mat and pressing the mat into a reconstituted leather product.

12 Claims, 1 Drawing Sheet

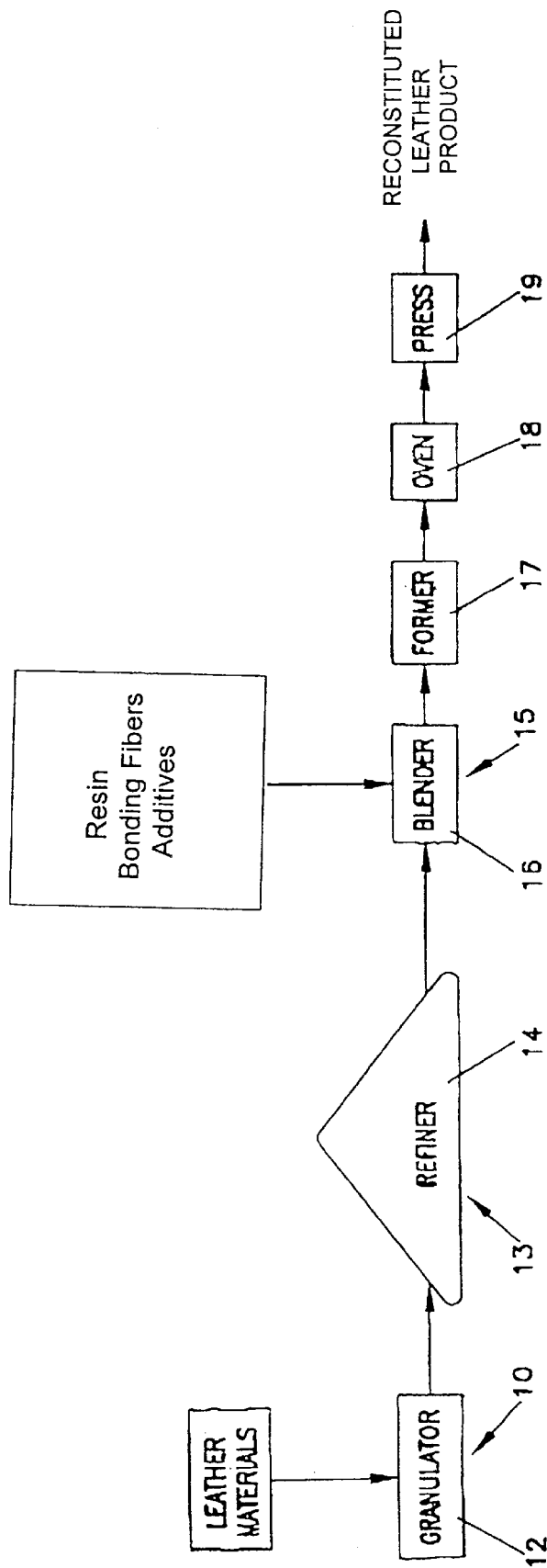
FIGURE

RECONSTITUTED LEATHER PRODUCT AND PROCESS

FIELD OF THE INVENTION

This invention relates to a reconstituted leather product and a process for producing a reconstituted leather product. More particularly, the invention relates to a dry process for forming a reconstituted leather product from leather fibers. The reconstituted leather product of the invention has desirable leather qualities, can be cut and sewn into leather products and is generally recyclable. The leather product of the invention can be reconstituted, that is, used as a starting material in the process of the invention.

BACKGROUND OF THE INVENTION

Conventional processes for producing tanned leather and tanned leather goods generate considerable waste material. Scraps from cut leather, wet blue shavings from the tanning process, and other leather waste from conventional leather processes is usually bulked and transported to landfills. Disposal of leather waste in this way is environmentally undesirable and can be costly to the leather producer. In addition, chromed tanned leather and chemicals used to produce leather products can be unwanted in landfill operations.

Current approaches to recycling leather waste materials include producing fertilizer by extracting portions of slurried leather. Considerable waste, requiring disposal, can be a byproduct of this extraction process.

Processes for producing a moldable mat from fibrous wood products are well known. One such process is disclosed in U.S. Pat. No. 4,418,031 to Doerer et al. In the Doerer et al. process, cellulose fibers are mixed with synthetic fibers, the synthetic fibers are melted, and then solidified to form a cohesive mat of cellulose and synthetic fibers. This process includes dry blending the fibers together, passing this blend through a former, curing the blend in an oven, and molding the cured blend into a shaped article.

It has been found that utilizing a dry process for making a fibrous mat is environmentally advantageous and relatively time and energy efficient. Typically, if a dry process is used for fibrous mat preparation and processing, then there is no slurry or waste byproduct that has to be discarded.

It would be highly desirable to develop a process for making a reconstituted leather product using limited amounts of water. It would also be highly desirable for this same process to recycle all types of scrap and waste leather and hide materials. Preferably, a process is developed such that the reconstituted leather product is continuously recyclable, that is, the reconstituted product at the end of its useful life is capable of entering the preparation process of the invention as a starting material.

Further, it is desirable to produce a reconstituted leather product having the strength and pliability of real leather. The reconstituted leather product can also have the ability to be cut and sewn into leather-like products. It is also desirable to produce a reconstituted leather product having similar physical properties when compared with natural, unrecycled leather.

SUMMARY OF THE INVENTION

Applicant has discovered a process for producing a reconstituted leather product by mixing leather fibers and other leather materials with synthetic fibers and resin in a relatively dry forming process. This process produces a reconstituted leather product that when finished can have the desired qualities of strength and pliability similar to natural, unrecycled leather.

The invention provides a reconstituted leather product and a process for making that product while recycling all types of leather scrap and waste. The process of the invention utilizes scrap leather from all aspects of the tanning and leather product producing process, including discarded and/or reconstituted leather products. The final reconstituted leather product of the invention can be finished to have the look and physical properties of real leather. The reconstituted leather of the invention is pliable and can be cut and sewn into leather-like products.

Preparing the reconstituted leather product of the invention involves combining leather fibers, bonding fibers, resins, and optionally other additives, such as additional fibers, wetting agents, colors and perfumes. Preferably all of these components are recyclable.

The term "leather fibers", as used herein, refers to fibers of natural leather, fibers of reconstituted leather, and/or mixtures thereof. As used herein, the term "leather materials" refers to materials of natural leather, of reconstituted leather, and/or mixtures thereof including waste materials generated in each step of the leather production process.

In the process of the invention, natural and/or reconstituted leather scrap and waste materials are reduced to leather fibers, mixed with bonding fibers, resin and optionally other additives in an essentially dry process to produce a reconstituted leather product. The reconstituted leather product has a distinct woven fiber appearance and can be soft and pliable when finished to possess the look of natural leather. Preferably, the reconstituted leather product is recyclable.

Applicants have found that this type of dry process is inappropriate for some types of leather processing and/or recycling, because the dry leather fibers or other leather materials can easily crumble or burn during the process. If the leather materials crumble or burn during the recycling process, the resulting reconstituted leather product's physical properties are diminished.

As used herein, the term "essentially dry" refers to a process in which the leather material used throughout the reconstitution process has a moisture content of about 25% by weight or less. A wet leather slurry is typically not formed in the process of the invention as compared with other attempts to recycle leather products.

Leather products made by the process of the invention are woven in appearance, and can be cut, sewn and shaped into products commonly formed of leather and/or synthetic leather materials including: insoles, mid soles and linings for shoes, boots, skates and other types of footwear; leather-like pads, liners, panels, supports or outside finishes for use in the apparel, furniture, packaging, automobile, computer and other industries.

The reconstituted leather product of the invention is preferably continuously recyclable. That is, the product produced by the method of the invention can be reduced to fibers and may again be used in the process of the invention, once it has outlived its useful life.

These and other features of the invention will become more apparent upon reading the following detailed description of the invention and preferred embodiments.

BRIEF DESCRIPTION OF THE DRAWING

The FIGURE represents a flow diagram of a process for preparing reconstituted leather products in accordance with the invention.

DETAILED DESCRIPTION OF THE INVENTION

The invention is directed toward reconstituted leather products and a process for making reconstituted leather products. The leather product is made from: natural and/or reconstituted leather materials that are reduced to fibers, bonding fibers, resin and optionally other additives. The reconstituted leather product of the invention has a look, feel and smell of real leather, when finished like leather. Moreover, the leather product is preferably recyclable itself. In other words, leather products of the invention generally are useful starting materials for the process of making the leather product of the invention. The leather product is generally formed by: reducing natural and/or reconstituted leather materials to specific size leather fibers, combining the leather fibers with bonding fibers, resin, and optionally other additives such as additional synthetic or naturally grown fibers, wetting agents, color and the like; forming a fibrous mat from the mixture; heating the mat to cause the coating of the bonding fibers to melt and induce adherence of the fibers to one another; and curing the resin dispersed in the mat, e.g., by pressure, to form the final product.

The process of the invention is essentially dry. The leather fibers typically do not have a moisture content greater than about 25% by weight during the reconstituted leather production process.

Leather Fibers

In general, natural and/or reconstituted leather materials, including scraps of cut leather, trimmings, blue shaving waste, stringers, old reconstituted leather products, and any other types of hide or leather waste are useful starting materials in the present invention. These leather starting materials are reduced to leather fibers for easier processing and greater reconstituted leather product stability. Applicants have found that reducing the leather materials to particular fiber sizes provides a leather product that has similar physical properties as real leather.

In general, the longer the fibers, the more stable the final product will be, because longer fibers are more likely to intertwine with each other during processing, which facilitates mat cohesiveness. However, if the fibers are too long, then they can entangle to form aggregates that can clog machinery or increase processing time. It is understood that leather dust and other leather materials smaller than the fiber sizes detailed below can be useful starting materials in the invention. However, most of the leather starting materials included in the invention should be larger than leather fibers in order to provide a reconstituted leather product having the desired physical properties, e.g. the strength and woven appearance of a leather product.

If too much leather dust is used in the invention, (i.e., more than about 5% by weight of the total amount of leather starting materials), then the strength and integrity of the product can be compromised. Reducing the bulk of the starting materials and scraps to leather dust or a fiber size smaller than detailed below typically produces a leather product that does not have the desired physical properties, such as tensile strength and durability of real leather. Reducing the materials to fiber sizes substantially larger than those detailed below, typically diminishes the processability of the leather fibers in the equipment used to blend the fibers and form the mat.

The bulk of the leather scrap and materials are reduced in a refining process to leather fibers that are generally at least about 0.05 inch in length and preferably at least 0.75 inch in length. Longer leather fibers (e.g., 1–2 inches) are preferred to facilitate production of a strong, leather-like product.

Although a uniform fiber length can be used, the leather fibers at the end of the reduction process are generally of varying lengths. As discussed above, longer leather fibers are preferred. Most preferably, the mixture of fibers used to form a mat includes at least about 50% by weight leather fibers of about 0.25 inch to about 1.0 inch in length. A preferred mixture of leather fibers would include about 75% leather fibers of greater than 0.25 inch in length and about 25% leather fibers less than 0.25 inch. For example, a suitable mixture includes about 50–60% by weight leather fibers of about 0.25 inch, about 25% by weight leather fibers of about 0.125 to 0.25 inch, and about 25% by weight leather fibers greater than 0.25 inch in length.

Applicant has found that optimally, the amount of moisture in the leather fibers during processing should be about 10% to 25% by weight. If the amount of moisture in the leather is significantly less than 10%, there is a tendency for the leather fibers to become brittle and inflexible, generate significant amounts of dust, and even for the leather fibers to burn. The product typically does not hold together well if the fibers are too dry. Thus, there is a greater tendency for holes to develop in the fibrous mat during the forming process. If the amount of moisture in the leather is significantly greater than 25%, the process would be inefficient and not enable good mixing of the mat-forming components. Extra time and energy would be required to dry the leather fibers during the reduction process, because the leather fibers could be too wet for further processing.

Starting Leather Materials

The leather fibers used in the process can be reduced to fibers from whole leather materials using any means known in the art that preserves the integrity of the resulting leather fibers. Generally, it is the integrity of the leather fibers that facilitates the reconstituted leather product having the physical properties similar to real leather. Equipment such as granulators and/or refiners can be used to reduce the leather materials to leather fibers.

Applicant has found that use of both types of equipment (i.e., granulator and refiner) individually or in combination can reduce leather materials to fibers. However, for large processing volume, Applicant has found that using a refiner in series with a granulator increases the volume of leather fibers efficiently obtained. In general, a granulator can reduce the leather materials to any desired size; however, the volume of leather that can be processed through a granulator is typically less than the volume of leather that can be processed through a refiner. Thus, for small volume products or processes, a granulator alone can efficiently be used to reduce the leather materials to fibers. For larger volume processes a granulator can initially reduce the size of large leather materials and then the smaller leather materials can be reduced to fibers in a refiner.

In a preferred embodiment of the invention, the leather materials are cut into small parts (e.g., about two-inches by two-inches or smaller) using a granulator, and then the small parts are reduced further to leather fibers using a refiner.

As shown in the FIGURE, leather materials and scraps, such as color trimmings, blue shavings, and stringers are put into a machine 10, such as a granulator 12, that cuts the materials into smaller parts for further processing. A granulator useful in the invention is commercially available from Cumberland Engineering in South Attleboro, Mass. Granulator 12, should not be operated in such a manner that the integrity of the leather materials is not preserved, (i.e., fiber structure is lost).

In a preferred embodiment, upon exit from granulator 12, the reduced size leather parts are transferred to a machine 13, such as refiner 14, where they are reduced to leather fibers. The leather parts can be transferred from machine 10 to refiner 14 by any means known in the art. Preferably, the leather materials are transferred by a conveyor system from machine 10 to machine 13. More preferably, the conveyor system has the capability of imparting moisture to the leather materials, if necessary.

Preferably, throughout the leather materials reduction process, about 10 to 25% by weight moisture is maintained in the leather materials. With this moisture level, the leather materials are relatively easy to reduce to size without creating significant amounts of leather dust. The amount of water imparted to the leather should not be so much that a slurry is created.

Upon exit from granulator 12, the leather parts can contain less than 15% moisture. Thus, if the conveyor system has the capability of imparting moisture to the leather materials as they are being transported from granulator 12 to refiner 14, then, if needed, moisture can be added to the leather materials at this stage. Enough water should be added such that the moisture of the leather materials entering the refiner 14 is at least 10% by weight and, preferably, not greater than 20%. Preferably the moisture of the leather materials entering refiner 14 is about 15% by weight.

The moisture content of a known sample size of leather can be measured using a moisture meter, such as that commercially available from Denver Instruments as model no. 1R-200.

A preferred refiner 14 has two opposed metal plates therein that are applied to the leather and rotated to tear the leather apart and release fibers. Refiner 14 produces fibers by destroying the matrix around the fibers while maintaining the fiber integrity of the leather. Any metal plates useful in a refiner and that can convert small leather parts to fibers by destroying the matrix around the fibers while maintaining the fiber integrity are useful in the invention. Various size metal plates can be used depending upon the desired fiber size.

Refiner plates with a suitable geometric configuration are those available from Durametal Corporation (Tualaton, Oreg.) formed of C-20 alloy and having a #428 Circle with a 002/in TRO taper (#30-36505-217). Refiner 14 is preferably operated at a temperature and mixing speed that are high enough to allow the leather materials to be efficiently pulled apart. However, the temperature and speed should not be so high as to cause the leather materials to burn, denature, or generate significant amounts of dust. Some water can be added to the leather parts during refining in order to maintain or to insure the moisture in the leather is between 10% and 25% inclusive. The temperature and mixing speed in refiner 14 can also be adjusted to facilitate prevention of dehydration of the leather. If too much water is added to the leather during the reduction process; however, leather dust can agglomerate or aggregate and clog the equipment, which decreases the tendency for creating a uniform product.

Applicant has found that a significant amount of the leather may burn in refiner 14, e.g. at temperatures of 350° F. and above. Preferably, the temperature in refiner 14 is at least about 200° F. and not greater than about 300° F. More preferably, refiner 14 temperature is not greater than about 275° F. and is at least about 220° F. A refiner commercially available from Andritz, Sprout & Bauer of Springfield, Ohio, is useful in the invention.

The refiner mixing speed varies with the volume of materials to be processed, the size and type of equipment used and the heat generated during mixing. Preferably, the mix speed is low enough that the intensity and strength of the leather material is preserved, and preferably, the mix speed is high enough so that processing time is minimized.

Leather fibers produced by the above described reduction process, or by other means, can be transferred to a mixer through equipment, such as a heating unit and/or a cyclone, if necessary, in order to adjust the moisture to a level of about 10% to 25% by weight. The heating unit should not be so warm that it burns or dehydrates the leather. Any heating unit known in the art can be used.

The fibers can also be transferred to a cyclone to facilitate reduction of the leather fiber moisture, if the fibers are too moist upon exiting the refiner. Any cyclone known in the art for transfer of materials can be used. Alternatively, if the moisture level is below about 10% by weight, water can be added to the fibers prior to their entering the blending process. However, there should not be so much water added that the moisture of the leather is greater than about 25% by weight. The leather fibers in accordance with the invention are blended with bonding fibers, resins and optionally other additives.

Bonding Fibers

The leather fibers and any other processable leather constituent, such as leather dust, are next blended with, preferably recyclable, bonding fibers. Bonding fibers are those fibers that when heated, melt to provide for adhesion of the fibrous content. The adhesion achieved via the bonding fibers is sufficient to permit movement of the formed but non-cured mat.

Bonding fibers useful in the invention are preferably those having an adhesive coating that melts, causing the blended fibers to adhere to one another. Upon melting, the coating provides adhesion to the fibrous mixture. The bonding fibers are generally synthetic fibers coated with an adhesive-type hot melt. Any bonding fiber that has a melt temperature in the mixture below that of leather, is useful in this invention. For example, CELBOND FIBER TYPE 105 (Hoechst Celanese) is particularly useful. Synthetic bonding fibers useful in the invention include polyester fibers, polyamide fibers, polyethylene fibers, acetate fibers and rayon fibers. Natural cotton fibers can even be used.

In preferred embodiments, the bonding fibers are approximately 0.5 to 1.5 inches in length, and have a denier of about 3. Useful bonding fibers are those able to be uniformly dispersed with the leather fibers and other components in the blending process.

In addition to the leather fibers and bonding fibers, other additive fibers can be used to further strengthen the final product. The type and amount of additive fiber used varies with the desired strength and end use of the leather product.

Generally, the longer the leather and bonding fibers, the less likely that additive fibers are needed in the invention for strength. As discussed below, additive fibers can be added to the bonding fibers and leather fibers in a mixture to improve the final product's physical properties and/or appearance, particularly the woven nature of the product, and strength as measured by slit and stitch.

Resins

Resin is preferably included in the mixture of fibers to help adhere the fibers together and provide durability, stability and cohesion to the fibrous mat and eventually to the reconstituted leather product. Resins useful in the present invention are preferably recyclable and thermoplastic. Thermoplastic resins are preferred over thermosetting resins, because thermoplastic resins can be more easily reshaped and recycled. Thermoplastic elastomers are generally flexible, whereas thermosetting resins are less flexible. The resins usually melt during the pressing process and facilitate solidification and cohesion of the final leather product.

Adding thermoplastic resin to the composition facilitates molding of the final product into particular shapes and sizes. However, it is noted that the leather product of the invention can be obtained without use of a resin. The bonding fibers can be a sufficient adhesive to form a cohesive mat and product for some applications. It is also noted that a thermosetting resin can be used in the invention.

Examples of preferred useful resins include thermoplastic resins such as polyolefins, polyamides, co-polyesters, styrene co-polymers, thermoplastic urethanes and polyurethanes. Examples of particularly preferred resins include thermoplastic polyurethane commercially available from BASF; thermoplastic polyolefins commercially available from Dow Plastics; styrene block co-polymers commercially available from Dexco Polymers; thermoplastic polyamide and copolyester commercially available from Elf Atochem; thermosetting resins such as commercially available from H.B. Fuller. Generally, the resins will have a published melting point of approximately 85°–350° F.

Some preferred resins include:

| Resin | | Type | Source | City, State |
|---|---|---|---|---|
| Aspun | 6835A | TP | Dow Plastics | Freeport, TX |
| | 6811A | | | |
| | 6806A | | | |
| | 6831A | | | |
| | 6830A | | | |
| Vector | 6241D | TP | Dexco Polymers | Houston, TX |
| | 6400D | | | |
| | 8550D | | | |
| | 2518D | | | |
| Platamid | H005 | TP | ELF Atochem | Philadelphia, PA |
| | H103 | | | |
| | M548 | | | |
| Fulatex | PN3408 | TS | HB Fuller | St. Paul, MN |

Any form of the resin can be included in the composition provided that the resin can be easily dispersed during mixing, and that the resin melts and flows during curing and/or pressing sufficiently to coat the fibrous mixture. It is undesirable for the resin to coagulate or agglomerate into clumps during processing; therefore, most preferably the resin is ground into a powder prior to mixing it into the composition. Resin powder is generally readily disbursed during mixing and melts evenly and quickly during the cure process. Thus, if resin pellets are used, for example, preferably the pellets are ground typically to not greater than 70 mesh prior to adding the resin to the composition.

Resin selection can vary with the end use of the leather product. For example, if a styrene block copolymer is used, then the amount of styrene in the copolymer can determine whether the reconstituted leather product is soft enough for an inner sole, for example, or hard enough for a mid sole or outer sole.

Other Additives

Other constituents, items or compounds can be combined with the resin, coated bonding fibers and leather fibers to form the leather product of the invention. Generally, these other additives facilitate processing and formation of the reconstituted leather product. Furthermore, the additives can help the product to maintain the desired appearance and physical properties. These additives include, but are not limited to: wetting agents, coloring agents, fire retardation agents and the like, as well as additive fibers for improving strength and woven appearance of the product.

Additive fibers are long (i.e., 0.75–1.50 inches), strength providing fibers, such as polyester, polyamide, polyethylene, acetate, rayon and cotton fibers. Additive fibers are added to the composition to increase the strength and durability (slit/stitch) of the final leather product. Additive fibers are especially useful when the fibers in the mixture are relatively short. Additive fibers are preferably long, for example, about 0.75 to 1.50 inches with a denier of at least 3. Most preferably, the additive fibers have a denier of about 15, and easily intertwine with the bonding fibers and leather fibers to strengthen the final leather product. Additive fibers can be the same type of fibers used as bonding fibers, but without the adhesive coating. Most preferably, additive fibers are synthetic fibers of about 1.0 inch to 1.5 inches in length and about 15 denier.

Additive fibers useful in the invention include polyester fibers, polyamide fibers, acetate fibers and rayon fibers. Most preferably, Trevira polyester fiber 103 commercially available from Hoechst Celanese of Salsbury, N.C. of 15 denier is used.

Another useful additive is Fybrel™-901 (MiniFibers, Johnson City, Tenn.). The addition of about 10% of the polyethylene product, Fybrel™-901, by weight of the total composition provides a strong product that has increased slit and stitch values when compared with a product that doesn't have this product.

A wetting agent can also be added during the blending process. A wetting agent facilitates the complete dispersion of the resin throughout the mixture. Particular wetting agents are used with and/or sold with particular types of resins. More preferred wetting agents are recyclable.

Fragrance agents and coloring agents can also be added to the blending process in order to impart desired odor and colors to the final product. Any type of coloring or fragrance agent known to be useful in a leather product can be used in the invention. Preferably, agents such as wax, used to impart water repellency to the leather product can also be added to the blending process.

It is understood that any components added to the composition should not interfere with the structural or physical integrity of the leather fibers. Furthermore, any components added to the composition cannot interfere with the bonding activity of the resin and/or the melting of the bonding fibers. Preferably, each component added to the composition is recyclable.

Blending Leather Product Components

The leather fibers and any other processable leather constituents are blended, as shown in the FIGURE, with the bonding fibers, resins and any other additives, such as additive fibers or wetting agents, in a mixing vessel 15. Preferably the mixing vessel is a blender 16 providing a Waring blender type mixing. These components are combined during the blending process to form a homogenous dispersion.

Limited amounts of water can be added to the blending process in order to insure that the moisture of the leather fibers is at least 10% by weight and not greater than about 25% by weight. It should be ensured that there is a minimum amount of free standing water in mixing vessel 15 and that the leather is not part of a slurry.

The total amount of leather fiber and the amount of each other type of fiber to be blended vary with the end use of the reconstituted leather product. Generally, a leather product with a higher amount of leather fibers is preferred. Furthermore, the amount of leather fiber cannot be so small that the final product does not have the similar look or physical properties of real leather.

Preferably at least 80% by weight of the composition is fibers of one type or another. The leather fibers preferably are a large percentage of the total fiber amount by weight. Generally, the larger the amount of leather fibers blended the more the final leather product will have the physical properties, look and feel of real leather. However, there must be some synthetic or other types of natural fibers included in the mixture in order to insure that the reconstituted leather product is cohesive and that the components are securely intertwined.

Preferably, at least about 50% of the total fiber amount by weight is leather fibers. More preferably, at least about 70% and not greater than about 80% by weight of the total fiber amount is leather. At least about 10% by weight of the total amount of fibers is preferably bonding fibers. More preferably, at least 20% by weight of the fibers are bonding fibers. The remainder of the fiber content can be additional fibers.

The amount of resin to be included in mixing vessel 15 varies with the different types of end uses of the reconstituted leather product. If too much resin is included in the blender, the product can be too brittle or hard for a particular application. If too little resin is included in the blender, cohesiveness of the product can be reduced, and the product may not be stable for a particular application. Generally, the amount of resin added to mixing vessel 15 is dependent upon the total amount of fiber added to the blender. The total amount of fiber to resin ratio is preferably in the range of 60:40 to 90:10.

Other additives, such as wetting agents, additive agents for color, fire retardation and the like, can be blended with the fibers and resin. Additional powdered hide and leather components, such as leather dust, can also be added to the blending mixture. The amounts of these additives to be included vary with the end use of the reconstituted leather products. Limited amounts of water can also be added to mixing vessel 15 in order to insure that the moisture in the leather fibers is at least 10% by weight and not greater than about 25%.

Mixing vessel 15, which is used to mix the leather fibers, bonding fibers, resin and additives, can be any standard high shear industry mixing vessel operating in a Waring blender type action, for example, that does not destroy the integrity of the leather fibers and that can combine the constituents to form a homogenous mixture. This mixture is an essentially dry homogenous dispersion. The mixing typically involves high shear at a rate of speed of about 5000 rpm. The mix time varies with the type of mixing vessel used. When using a blender 16, a mix time of approximately 5–15 minutes is typical to insure a completely dispersed and homogeneous blend.

Forming a Leather Product

As shown in the FIGURE, the mixture is then transferred from mixing vessel 15 to a former 17 where the blended mixture is formed into a mat. The mixture can be transferred to former 17 using feeding and/or pre-feeding equipment (not shown). This feeding and/or pre-feeding equipment can insure that the constituents are evenly dispersed throughout the mixture prior to being fed into former 17. Such types of equipment are available as the Rando Prefeeder and Rando-Feeder® from Rando Machine Corporation of Macedon, N.Y.

Once the mixture is transferred to and from any feeding system (not shown), it enters former 17. Preferably a mat is formed in former 17 using an air-laid forming process. An air-laid forming process can be carried out, for example, on a mat-forming machine, such as that produced by Rando Machine Corp., Macedon, N.Y. In using the air-laid former, typically the blended mixture is poured onto screens which are subjected to air blown against the bottom of the screen. During the air-laid process, typically heavier elements of the leather fiber mixture settle to the bottom of the formed product, whereas lighter materials are blown toward the top.

The formed mat emerging from the air-laid former is then passed through a drying oven 18. The bonding fibers, preferably, begin to melt in the oven to initiate the formation of a cohesive mat. Most preferably, the mat passes through oven 18 at a rate of about 15 feet per minute. Preferably, the oven temperature is at least about 325° F. and not greater than about 350° F. The oven temperature is preferably hot enough to melt the coating on the bonding fibers and to begin melting any resin. However, the oven should not be so hot that the resin melts completely and begins to flow. The mat also dries in the oven. Thus, any excess moisture in the mat is evaporated. The dried, formed, reconstituted leather product exiting the oven in sheet form can be rolled up and set aside to be pressed, as needed.

Pressing the Leather Product

After exiting the oven, the leather product sheets are pressed to cure the resin dispersed in the product. Pressing of the formed, dried product at a sufficiently high temperature causes the resin to flow throughout the fiber matrix of the product facilitating cohesiveness. If the temperature is too high during pressing, the product can burn. If the temperature is too low, then the resin will not cure. Preferably, the temperature in press 19 is at least about 30° F. higher than the melting point of the resin. However, the press temperature should not be so high that the fibers themselves burn or begin to melt. Most preferably, press 19 temperature is about 30° F. above the resin melting point. Typically, the press temperature is dependent on the type of resin used.

The pressure in press 19 must not be so low that the resin does not melt and flow during the pressing process. Applicants have found that for most applications a press pressure of about 5–25 tons is preferred. The mat is then removed from the press and stored. Usually, a mat of the invention is pressed for at least 15 seconds and not greater than about 60 seconds under a pressure of about 5–25 tons.

A suitable press for use in the inventive method is that sold by Pasadena Hydraulic Inc. (PHI, El Monte, Calif.) having a pressure range of 0–3000 lbs. (0–165 tons), a 24/24 Electric heated platen with a Ram diameter of 11.75 inches.

Properties of the Leather Product

The resulting leather product is generally pliable, yet strong. It optionally includes color agents, and the like. The reconstituted leather product can be cut, sewn and formed into a multitude of products which are typically formed from synthetic leather components.

The reconstituted leather product is preferably made of materials that are completely recyclable. In other words, the product from this process can be recycled through the same method by which it was produced to form an eternally-recyclable reconstituted leather product. The leather products of the invention preferably have physical properties similar to real leather. They preferably have a tensile strength as measured by ASTM D-2209-95 of at least about 800 lbs/in$^2$ and not greater than about 2000 lbs/in$^2$. The leather products of the invention preferably have a slit of at least 20 lbs as measured by ASTM-D2212-94 and a stitch of at least 30 when measured in accordance with ASTM-D4705-93. Most preferably, the slit and stitch values are at least 50 lbs., when measured in accordance with their respective tests. Preferably, the leather products of the invention have a Bally flex of at least 50,000.

Optionally, the finished product may be embossed to produce a desired leather-like product. The leather product of the invention can also be molded into various shapes for a variety of applications.

Celanese, Salsbury, N.C.) with 2.5 pounds of Trevina Polyester Fiber 103 uncoated fibers (1.5 inch and 15 denier) (Hoechst Celanese, Salsbury, N.C.), 4.0 pounds of Platamid H005 resin and 4.0 pounds of water.

This mixture was blended in a Waring-type blender having a 500 hp motor at a speed of about 5000 rpm for about 5–15 minutes at ambient temperature to form a homogeneous dispersion. The mixture was then transferred by a Rando-Feeder (Rando-Webber® of Macedon, N.Y) to an air-laid former (60 inch width) (Rando Machine Corp., Macedon, N.Y.) operated at a conveyor rate of 15 feet per minute. The formed mat was then heated in a drying oven, passing through the oven at a rate of about 15 feet per minute at a temperature of about 325° F. The mat was then transferred to the press, where it was pressed at the resin's melting temperature. Eleven mats were made as described above and pressed for the times and at the pressures listed in the table. Each of the eleven mats was analyzed for its physical properties. The tests performed in accordance with the ASTM methods mentioned below. Data are shown below in Table 1.

TABLE 1

| | Press Conditions | | | Physical Properties of Mat* | | | | | |
|---|---|---|---|---|---|---|---|---|---|
| Sample No. | Press Pressure (Tons) | Press Time(s) | (N/S) Mat Thickness (mm) | Tensile Strength (N/S) (lbs./in$^2$) | Tensile Strength (E/W) (lbs./in$^2$) | (E/W) Mat Thickness (mm) | Slit (lbs) | Stitch | Bally Flex |
| 1 | 5 | 15 | 2.8 | 600 | 540 | 3.02 | 25 | 34 | |
| 2 | 5 | 20 | 3.07 | 530 | 585 | 3.03 | 40 | 46 | |
| 3 | 5 | 30 | 2.67 | 645 | 710 | 2.64 | 35 | 34 | |
| 4 | 5 | 60 | 2.55 | 755 | 745 | 2.46 | 28 | 37 | |
| 5 | 10 | 15 | 2.87 | 475 | 370 | 2.76 | 24 | 37 | |
| 6 | 10 | 30 | 2.55 | 595 | 770 | 2.57 | 33 | 40 | |
| 7 | 10 | 60 | 2.25 | 1060 | 985 | 2.22 | 48 | 35 | |
| 8 | 25 | 15 | 2.34 | 935 | 795 | 2.43 | 43 | 32 | |
| 9 | 25 | 20 | 2.27 | 1140 | 885 | 2.18 | 35 | 34 | |
| 10 | 25 | 30 | 1.85 | 1345 | 875 | 1.86 | 37 | 46 | |
| 11 | 25 | 60 | 1.93 | 975 | 1225 | 1.94 | 42 | 42 | >50K |

*Mat Size was 24" × 24".

EXAMPLES

Example 1

Production of a Leather Product

Leather materials were processed through a granulator and refiner in series to produce leather fibers. Water was added to the leather materials in order to insure that the moisture of the leather materials was about 15% by weight. The water was added as the leather materials were transferred by conveyor from the granulator to the refiner. The moisture of the leather was measured using the moisture meter identified previously. The leather pieces of material were reduced in the granulator to approximately 2"×2" squares. These squares, having about a 15% moisture, were transferred into a refiner (continuous feed of 1200 lbs. per hour) and leather fibers were produced having a length of about 0.25 inches and ranging generally from about 0.25–0.5 inches.

Leather fibers (25 pounds) were mixed in a blender with 7.5 pounds of CELBOND FIBER TYPE 105 bicomponent fibers 105 bonding fibers, (0.5 inch and 3 denier) (Hoechst- The tensile strength and thickness of the mat were measured in accordance with ASTM D2209-95 in both the north/south and east/west directions. The stitch was measured in accordance with ASTM D4705-93. The slit was measured in accordance with ASTM D2212-94. Bally Flex was analyzed using a Bally Testoflexor and testing a 2–3 inch sample through 50,000 cycles (about 8 hours) and visually examining the sample for cracking, peeling or checking.

Example 2

A leather product of the invention was prepared in accordance with the process described for Example 1. However, instead of Platamid H005 being used as the resin, seven pounds of Dexco 8550 were used. The results are shown below in Table 2.

TABLE 2

| | Press Conditions | | | Physical Properties of Mat* | | | | | |
|---|---|---|---|---|---|---|---|---|---|
| Sample No. | Press Pressure (Tons) | Press Time(s) | (N/S) Mat Thickness (mm) | Tensile Strength (N/S) (lbs./in²) | Tensile Strength (E/W) (lbs./in²) | (E/W) Mat Thickness (mm) | Slit (lbs) | Stitch | Bally Flex |
| 1 | 15 | 45 | .308 | 880 | 1250 | .345 | 54 | 63 | >50 |
| 2 | 15 | 60 | .345 | 900 | 795 | .338 | 76 | 63 | >50 |
| 3 | 20 | 45 | .242 | 945 | 1695 | .249 | 54 | 64 | >50 |
| 4 | 20 | 60 | .237 | 1350 | 1740 | .245 | 59 | 36 | >50 |
| 5 | 20 | 60 | .273 | 1470 | 1475 | .258 | 61 | 65 | >50 |

*Mat size 24" × 24".

Example 3

A leather product of the invention was prepared in accordance with the method described for Example 1. However, the ingredients were as follows: leather fibers (25 pounds); CELBOND FIBER TYPE 105 bicomponent fibers 105 (7.5 pounds); Trevina polyester fiber 103 (2.5 pounds) ; Fybrel™-901 (2.5 pounds) spun 6835A (7.0 pounds). The results are shown below in 3.

TABLE 3

| | Press Conditions | | | Physical Properties of Mat** | | | | | |
|---|---|---|---|---|---|---|---|---|---|
| Sample No. | Press Pressure (Tons) | Press Time(s) | Mat Thickness (mm) | Tensile Strength (N/S) (lbs./in²) | Tensile Strength (E/W) (lbs./in²) | Mat Thickness (mm) | Slit (lbs) | Stitch | Bally Flex |
| 1* | 20 | 30 | 3.02 | 1125 | 1395 | 2.95 | 77 | 64 | >50K |
| 2* | 20 | 30 | 3.01 | 1110 | 1355 | 2.98 | 72 | 83 | >50K |

*The web weight of each sample was 195 gm/ft².
**Mat size 22" × 22".

Example 4

A leather product of the invention was prepared in accordance with the method described for Example 1. However, the ingredients were as follows: leather fibers (25 pounds); Cellobond® bicomponent fibers 105 (7.5 pounds); Trevina polyester fiber 103 (2.5 pounds); Fybrel™-901 (2.5 pounds); Platamid H005 (7.0 pounds), and water (4.0 pounds). The components were mixed and processed as described for Example 1. The resulting product was analyzed as described in Example 1. Data are shown below in Table 4.

TABLE 4

| | Press Conditions | | | Physical Properties of Mat* | | | | | |
|---|---|---|---|---|---|---|---|---|---|
| Sample No. | Press Pressure (Tons) | Press Time(s) | Mat Thickness (mm) | Tensile Strength (N/S) (lbs./in²) | Tensile Strength (E/W) (lbs./in²) | Mat Thickness (mm) | Slit (lbs) | Stitch | Web-wt gm/ft² |
| 1 | 10 | 20 | .28 | 415 | 570 | .268 | 28 | 25 | 425 |
| 2 | 10 | 15 | .257 | 435 | 555 | .237 | 23 | 26 | 380 |
| 3 | 10 | 10 | .229 | 355 | 360 | .225 | 16 | 17 | 308 |
| 4 | 10 | 10 | .246 | 450 | 610 | .204 | 20 | 21 | 286 |
| 5 | 15 | 25 | .346 | 675 | 730 | .340 | 42 | 48 | 521 |
| 6 | 15 | 10 | .254 | 520 | 410 | .247 | 23 | 27 | 390 |

*Mat size 22" × 22".

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A reconstituted leather product comprising:

leather fibers in an amount of at least 50% by weight of the total fiber amount;

bonding fibers in an amount of at least 20% by weight of the total fiber amount; and polymeric resin, wherein the reconstituted leather product at the end of the product's useful life is capable of being used as a starting material in the formation of the reconstituted leather product and the reconstituted leather product is produced by an essentially dry process.

2. The leather product of claim 1, wherein the resin is a thermoplastic resin.

3. The leather product of claim 1, wherein the product has a slit tear resistance of at least 20 lbs. when measured in accordance with ASTM D-2212-94.

4. The leather product of claim 1, wherein the product has a stitch tear strength of at least 30 lbs. when measured in accordance with ASTM-D-4705-93.

5. The leather product of claim 1, wherein the product has a slit tear resistance of at least 50 lbs. when measured in accordance with ASTM D-2212-94 and a stitch tear strength of at least 50 lbs. when measured in accordance with ASTM-D-4705-93.

6. The reconstituted leather product of claim 1, wherein the leather fibers have a length in the range of 0.25 to 1.0 inch.

7. The reconstituted leather product of claim 1, wherein the bonding fibers have a length in the range of 0.5 to 1.5 inch.

8. The reconstituted leather product of claim 1, wherein the bonding fibers include synthetic fibers coated with hot melt adhesive.

9. The reconstituted leather product of claim 1, wherein the bonding fibers comprise polyester, polyamide, polyethylene, acetate, rayon, or mixtures thereof.

10. The reconstituted leather product of claim 1, wherein the resin comprises polyolefin, polyamide, copolyester, styrene co-polymer, polyurethane, or mixtures thereof.

11. The reconstituted leather product of claim 1, further comprising additive fibers having a length in the range of 0.75 to 1.5 inch.

12. A reconstituted leather product produced by the process of:

blending leather fibers in an amount of at least 50% by weight of the total fiber amount with bonding fibers in an amount of at least 10% by weight of the total fiber amount, and resin to form an essentially dry homogeneous dispersion where said blending fibers melt when exposed to temperatures of between 325° F. and 350° F., forming the blended mixture into a mat; and curing the resin in the formed mat to produce a reconstituted leather product wherein the product is produced by an essentially dry process.

* * * * *